US009625123B2

(12) United States Patent
Ouderkirk et al.

(10) Patent No.: US 9,625,123 B2
(45) Date of Patent: Apr. 18, 2017

(54) LENS ASSEMBLY FOR REMOTE PHOSPHOR LED DEVICE

(75) Inventors: Andrew J. Ouderkirk, St. Paul, MN (US); Ravi K. Sura, St. Paul, MN (US); Nicholas T. Gabriel, St. Paul, MN (US); Huang Chin Hung, Taipei (TW)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 18 days.

(21) Appl. No.: 14/348,384

(22) PCT Filed: Jun. 14, 2012

(86) PCT No.: PCT/US2012/042367
§ 371 (c)(1),
(2), (4) Date: Mar. 28, 2014

(87) PCT Pub. No.: WO2013/055412
PCT Pub. Date: Apr. 18, 2013

(65) Prior Publication Data
US 2014/0218938 A1    Aug. 7, 2014

Related U.S. Application Data

(60) Provisional application No. 61/547,364, filed on Oct. 14, 2011.

(51) Int. Cl.
*F21V 13/14* (2006.01)
*F21V 5/04* (2006.01)
(Continued)

(52) U.S. Cl.
CPC ............... *F21V 13/14* (2013.01); *F21V 5/04* (2013.01); *F21V 7/22* (2013.01); *F21V 9/16* (2013.01);
(Continued)

(58) Field of Classification Search
CPC ...................................................... F21V 13/14
See application file for complete search history.

(56) References Cited

U.S. PATENT DOCUMENTS 5,882,774 A    3/1999   Jonza
6,783,349 B2   8/2004   Neavin
(Continued)

FOREIGN PATENT DOCUMENTS

EP    1930959 A1    8/2003
EP    1588435       10/2005
(Continued)

OTHER PUBLICATIONS

TW201022585A English translation.*
(Continued)

*Primary Examiner* — Jong-Suk (James) Lee
*Assistant Examiner* — Eric T Eide
(74) *Attorney, Agent, or Firm* — Gregg H. Rosenblatt

(57) ABSTRACT

Lens assemblies for use in remote phosphor lighting systems, and methods of making and using them, are described. The lens assemblies typically include a lens member, a dichroic reflector attached to an outer surface of the lens member, and a phosphor layer attached to an inner surface of the lens member. The dichroic reflector reflects LED light originating from a given source point in a reference plane proximate the inner surface to a given image point in the reference plane. The phosphor layer may be patterned to cover one or more first portions of the inner surface and to expose one or more second portions, and/or the phosphor layer may be removably bonded to the inner surface. The lens assemblies can be readily combined with one or more short wavelength (e.g. blue) LEDs and other components to provide a remote phosphor lighting system.

6 Claims, 8 Drawing Sheets

(51) Int. Cl.
- *F21V 7/22* (2006.01)
- *F21V 9/16* (2006.01)
- *G02B 19/00* (2006.01)
- *F21Y 101/00* (2016.01)
- *F21Y 105/12* (2016.01)
- *F21Y 105/10* (2016.01)
- *F21Y 115/10* (2016.01)
- *F21Y 113/13* (2016.01)

(52) U.S. Cl.
CPC ..... *G02B 19/0028* (2013.01); *G02B 19/0061* (2013.01); *G02B 19/0095* (2013.01); *F21Y 2101/00* (2013.01); *F21Y 2105/10* (2016.08); *F21Y 2105/12* (2016.08); *F21Y 2113/13* (2016.08); *F21Y 2115/10* (2016.08)

(56) References Cited

U.S. PATENT DOCUMENTS

| | | | |
|---|---|---|---|
| 6,967,778 | B1 | 11/2005 | Wheatley |
| 7,091,653 | B2 | 8/2006 | Ouderkirk |
| 7,534,002 | B2 * | 5/2009 | Yamaguchi et al. ............ 362/84 |
| 7,618,158 | B2 * | 11/2009 | Li ............................ 362/296.01 |
| 8,104,908 | B2 * | 1/2012 | Harbers et al. ................. 362/84 |
| 2004/0145913 | A1 | 7/2004 | Ouderkirk |
| 2006/0291186 | A1 * | 12/2006 | Marcus et al. ................. 362/84 |
| 2009/0052833 | A1 | 2/2009 | Yang |
| 2010/0149814 | A1 | 6/2010 | Zhai |
| 2010/0177497 | A1 | 7/2010 | Leung et al. |
| 2010/0238648 | A1 * | 9/2010 | Tsukahara ................... 362/97.1 |
| 2010/0248444 | A1 * | 9/2010 | Yamazaki et al. ............ 438/458 |
| 2010/0259918 | A1 | 10/2010 | Rains |
| 2011/0012147 | A1 | 1/2011 | Bierhuizen |
| 2011/0175518 | A1 | 7/2011 | Reed |
| 2011/0248305 | A1 * | 10/2011 | Ling .............................. 257/98 |

FOREIGN PATENT DOCUMENTS

| | | |
|---|---|---|
| JP | 2001-148512 | 5/2001 |
| TW | 200520241 | 6/2005 |
| TW | 201022585 A * | 6/2010 |
| WO | 2007108663 A1 | 9/2007 |
| WO | WO 2008-106067 | 9/2008 |
| WO | WO 2009-039824 | 4/2009 |
| WO | WO 2009-134433 | 11/2009 |
| WO | WO 2010-128438 | 11/2010 |
| WO | WO 2011-130718 | 10/2011 |
| WO | WO 2012-091973 | 7/2012 |
| WO | WO 2012-091975 | 7/2012 |

OTHER PUBLICATIONS

Ishida, "A novel ultra-thin blacklight system without optical sheets using a multi-layered lightguide," Journal of the Society for Information Display, 2011, vol. 19/12, pp. 923-930.

Lin, "Design of the ring remote phosphor structure for phosphor-converted white-light-emitting diodes". Japanese Journal of Applied Physics, 2010, vol. 49, pp. 072101-1-072101-6.

International Search Report for PCT Application No. PCT/US2012/042367 Mailed on Dec. 26 2012, 4 pages.

* cited by examiner

LENS ASSEMBLY FOR REMOTE PHOSPHOR LED DEVICE

FIELD OF THE INVENTION

This invention relates generally to light sources, with particular application to solid state light sources that incorporate a light emitting diode (LED) and a phosphor. The invention also relates to associated articles, systems, and methods.

BACKGROUND

Solid state light sources that emit broadband light are known. In some cases, such light sources are made by applying a layer of yellow-emitting phosphor onto a blue LED. As light from the blue LED passes through the phosphor layer, some of the blue light is absorbed, and a substantial portion of the absorbed energy is re-emitted by the phosphor as Stokes-shifted light at longer wavelengths in the visible spectrum, typically, yellow light. The phosphor thickness is small enough so that some of the blue LED light passes all the way through the phosphor layer, and combines with the yellow light from the phosphor to provide broadband output light having a white appearance.

Other LED-pumped phosphor light sources have also been proposed. In U.S. Pat. No. 7,091,653 (Ouderkirk et al.), a light source is discussed in which light from an LED is reflected by a long-pass reflector onto a phosphor layer. The phosphor layer emits visible (preferably white) light, which light is substantially transmitted by the long-pass reflector. The LED, phosphor layer, and long-pass filter are arranged in such a way that as light travels from the LED to the long-pass reflector it does not pass through the phosphor layer.

BRIEF SUMMARY

We have developed a new family of lens assemblies for use in remote phosphor lighting systems, and methods of making and using them. The lens assemblies typically include a lens member, a dichroic reflector attached to an outer surface of the lens member, and a phosphor layer attached to an inner surface of the lens member. The dichroic reflector reflects LED light originating from a given source point in a reference plane proximate the inner surface to a given image point in the reference plane. The phosphor layer may be patterned to cover one or more first portions of the inner surface and to expose one or more second portions, and/or the phosphor layer may be removably bonded to the inner surface. The lens assemblies can be readily combined with one or more short wavelength (e.g. blue) LEDs and other components to provide a remote phosphor lighting system.

The lens assemblies can also be used to make remote phosphor lighting systems in efficient and convenient ways. One approach involves removably bonding a phosphor layer to an inner surface of a lens member, and then patterning the phosphor layer to expose portion(s) of the inner surface while other portion(s) of the inner surface remain covered by the remainder of the phosphor layer. The phosphor layer may in some cases be patterned by scoring and then separating portion(s) of the phosphor layer from the remainder of the phosphor layer, e.g. by peeling.

We describe herein, among other things, lens assemblies for use in remote phosphor LED devices, the lens assemblies including a lens member, a dichroic reflector, and a phosphor layer. The lens member may have an outer surface and an inner surface, the outer surface being curved to define an optical axis that intersects the inner surface. The dichroic reflector may be attached to at least a portion of the outer surface of the lens member, and may be configured to reflect LED light originating from a given source point in a reference plane proximate the inner surface to a given image point in the reference plane. The phosphor layer, which is adapted to emit phosphor light, may be attached to at least a portion of the inner surface. The dichroic reflector is adapted to transmit the phosphor light. The phosphor layer may be patterned to cover one or more first portions of the inner surface and to expose one or more second portions of the inner surface, the given image point being disposed proximate the one or more first portions and the given source point being disposed proximate the one or more second portions. Alternatively or in addition, the phosphor layer may be removably bonded to the inner surface of the lens member.

The outer surface of the lens member may be continuously curved, and, in some cases, the outer surface may be substantially hemispherical. The outer surface may also be partitioned. For example, the outer surface may comprise a Fresnel lens surface. The outer surface may also comprise a plurality of arcuate features that segment the outer surface into distinct portions. The dichroic reflector may be made to cover substantially all of the outer surface of the lens member, or it may cover at least 50%, 70%, or 80% of the area of the outer surface of the lens member.

The inner surface may in some cases be flat. The given source and image points may define a line segment bisected by a reference point, the reference point being disposed at an intersection of the optical axis with the reference plane. The lens member may have a transverse dimension D, and a minimum separation between the reference plane and the inner surface may be less than D/10, and may be zero. The reference plane may include a point of intersection between the optical axis and the inner surface.

The phosphor layer may be removably bonded to the inner surface, and it may cover the inner surface both at the given image point and at the given source point. The dichroic reflector may be effective to concentrate the reflected LED light originating from the given source point at the given image point.

The assembly may also include an adhesive layer disposed between the phosphor layer and the inner surface, and the adhesive layer may have a bond strength low enough to allow a portion of the phosphor layer to be separated from the inner surface. One or more spacer elements may also be attached to the inner surface of the lens member. The one or more spacer elements may include a ring structure that encircles the phosphor layer.

The light generated by the phosphor layer may include broadband visible light. The broadband visible light may comprise yellow light, or the broadband visible light may comprise white light, for example.

We also disclose methods of making a remote phosphor LED device. These methods may include providing a lens member having an outer surface and an inner surface, the outer surface being curved to define an optical axis that intersects the inner surface. The methods may also include attaching a dichroic reflector to at least a portion of the outer surface, the dichroic reflector being configured to reflect LED light originating from a given source point in a reference plane proximate the inner surface to a given image point in the reference plane. The methods may also include removably bonding a phosphor layer to at least a portion of the inner surface, the phosphor layer comprising one or more first portions that cover one or more first portions of the inner surface and one or more second portions that cover one or more second portions of the inner surface, the given image point being disposed proximate the one or more first portions of the inner surface and the given source point being disposed proximate the one or more second portions of the inner surface. The methods may further include patterning the phosphor layer to expose the one or more second portions of the inner surface.

In some cases, the patterning may include scoring the phosphor layer between the one or more first portions and the one or more second portions of the phosphor layer, and separating the one or more second portions of the phosphor layer from the inner surface of the lens member. The separating may involve peeling the one or more second portions of the phosphor layer away from the inner surface. The scoring may involve pressing a die cutter against the phosphor layer.

In some cases, the patterning includes increasing a bond strength of the phosphor layer to the inner surface at the one or more first portions of the phosphor layer relative to a bond strength of the phosphor layer to the inner surface at the one or more second portions of the phosphor layer. In some cases, the method also includes providing one or more tabs connected to the phosphor layer, and the patterning includes peeling away the one or more second portions of the phosphor layer using the one or more tabs.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

In the figures, like reference numerals designate like elements.

DETAILED DESCRIPTION OF ILLUSTRATIVE EMBODIMENTS

Figure 1:
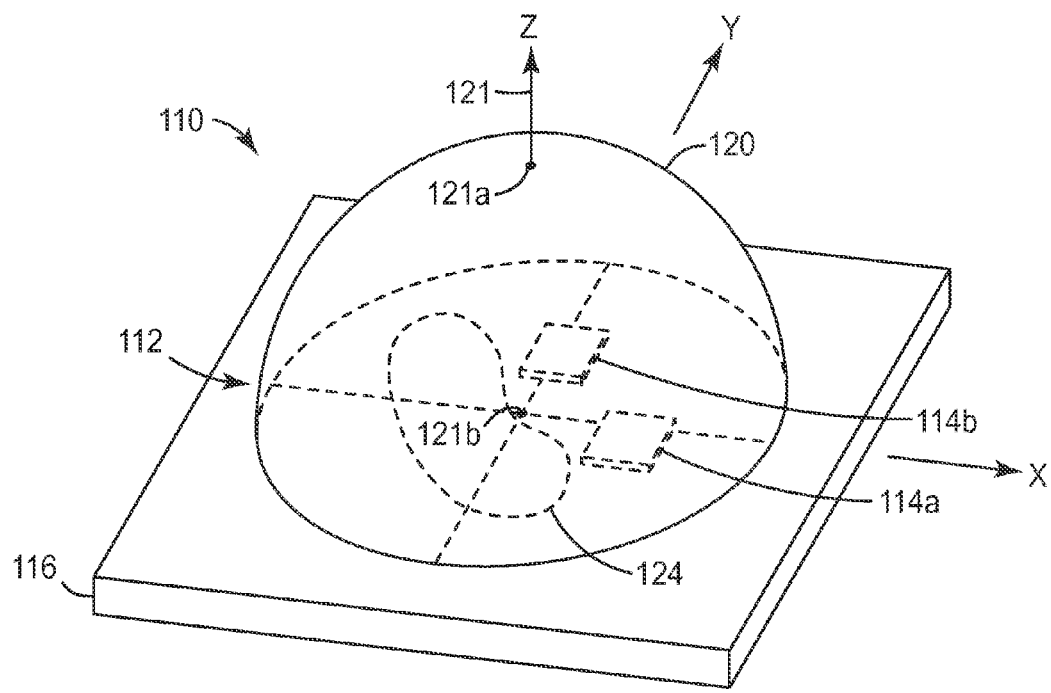
FIG. 1 is a schematic perspective view of a remote phosphor broadband light source that includes a lens assembly.

As mentioned above, the present application describes, among other things, lens assemblies for use in broadband solid state light sources, the light sources utilizing a phosphor layer or material that is pumped or excited by light from one or more solid state light emitting devices such as an LED. The sources also include a dichroic reflector that reflects at least some of the light from the LED onto the phosphor layer. As light propagates from the LED to the dichroic reflector, it does not pass through the phosphor layer. However, the LED light reflected by the dichroic reflector then impinges on the phosphor layer, causing it to emit longer wavelength phosphor light. The phosphor light passes through the dichroic reflector to provide or contribute to the broadband output light of the light source. Some of the LED light, which is typically blue in color or of a similar short wavelength, may also pass through the dichroic reflector rather than being reflected so as to also contribute to the broadband output light of the light source.

In this regard, "light emitting diode" or "LED" refers to a diode that emits light, whether visible, ultraviolet, or infrared, although in most practical embodiments the emitted light will have a peak wavelength in a range from about 430 to 530 nm, or from about 440 to 500 nm, or from about 445 to 480 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). Examples of suitable III-V semiconductor materials include nitrides, such as gallium nitride, and phosphides, such as indium gallium phosphide. Other types of III-V materials can also be used, as well as inorganic materials from other groups of the periodic table. The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. The LED may be grown on one of several substrates. For example, GaN LEDs may be grown by epitaxy on sapphire, silicon, and gallium nitride. An "LED" for purposes of this application should also be considered to include organic light emitting diodes, commonly referred to as OLEDs.

In FIG. 1, we see a schematic perspective view of a remote phosphor broadband light source 110 that includes a lens assembly 112. For reference purposes, the source 110 is depicted in relation to an xyz Cartesian coordinate system. The assembly 112 is positioned over two LEDs 114a, 114b, which are carried by a substrate 116. The LEDs typically emit light of a relatively short wavelength, e.g., primarily blue light and/or ultraviolet light, although in some cases blue-green or green light may also be used. The LEDs may emit such light in all directions from their outer surfaces, and much of this light propagates upward (from the standpoint of FIG. 1) to the lens assembly 112.

The lens assembly 112 includes a lens member 120, a dichroic reflector (not labeled in FIG. 1), and a phosphor layer 124. The lens member includes an outer surface and an inner surface, the outer surface being curved to define an optical axis 121 that intersects the outer surface at a point 121a and that intersects the inner surface at a point 121b. The dichroic reflector may be attached to at least a portion of the outer surface of the lens member 120, e.g., it may cover at least 50%, 70%, or 80% of the area of the outer surface of the lens member, and in some cases the dichroic reflector may attach to and cover substantially the entire outer surface. Further, the dichroic reflector is preferably shaped and otherwise configured to reflect LED light originating from a given source point in a reference plane proximate the inner surface to a given image point in the reference plane. This configuration is discussed further below in connection with FIG. 4. In the embodiment of FIG. 1 and in other embodiments depicted herein, the dichroic reflector preferably conforms to the outer surface of lens member, such that the shape (e.g. curvature) of the dichroic reflector is substantially the same as the shape of the lens member's outer surface.

The phosphor layer 124 is attached to a portion of the inner surface of the lens member, and is adapted to emit phosphor light in response to illumination by, and absorption of, the LED light. Furthermore, the phosphor layer is patterned or shaped to cover a first portion of the inner surface and to expose a second portion of the inner surface. The LEDs 114a, 114b are disposed near the second (exposed) portion of the inner surface, so that light from the LEDs is able to propagate from the LEDs through the lens member 120 to the dichroic reflector without passing through the phosphor layer. The LED light that is reflected by the dichroic reflector is roughly imaged (e.g. focused or concentrated) onto the phosphor layer, causing it to emit phosphor light (i.e., to fluoresce). (Stated differently, the given image point may be said to be disposed proximate the first (covered) portion of the inner surface, and the given source point may be said to be disposed proximate the second (exposed) portion of the inner surface.) With appropriate selection of phosphor material in the phosphor layer, the phosphor light can be tailored to be broadband, preferably having a yellow or white appearance to the human eye. Phosphor light emitted by the phosphor layer 124 passes through the lens member 120 and impinges on the dichroic reflector at the outer surface, whereupon it is substantially transmitted as a result of the dichroic reflector's high transmission for the phosphor light.

The phosphor light transmitted by the dichroic reflector combines with any LED light that may be transmitted by the dichroic reflector to produce the broadband output light of the light source 110.

Figure 2:
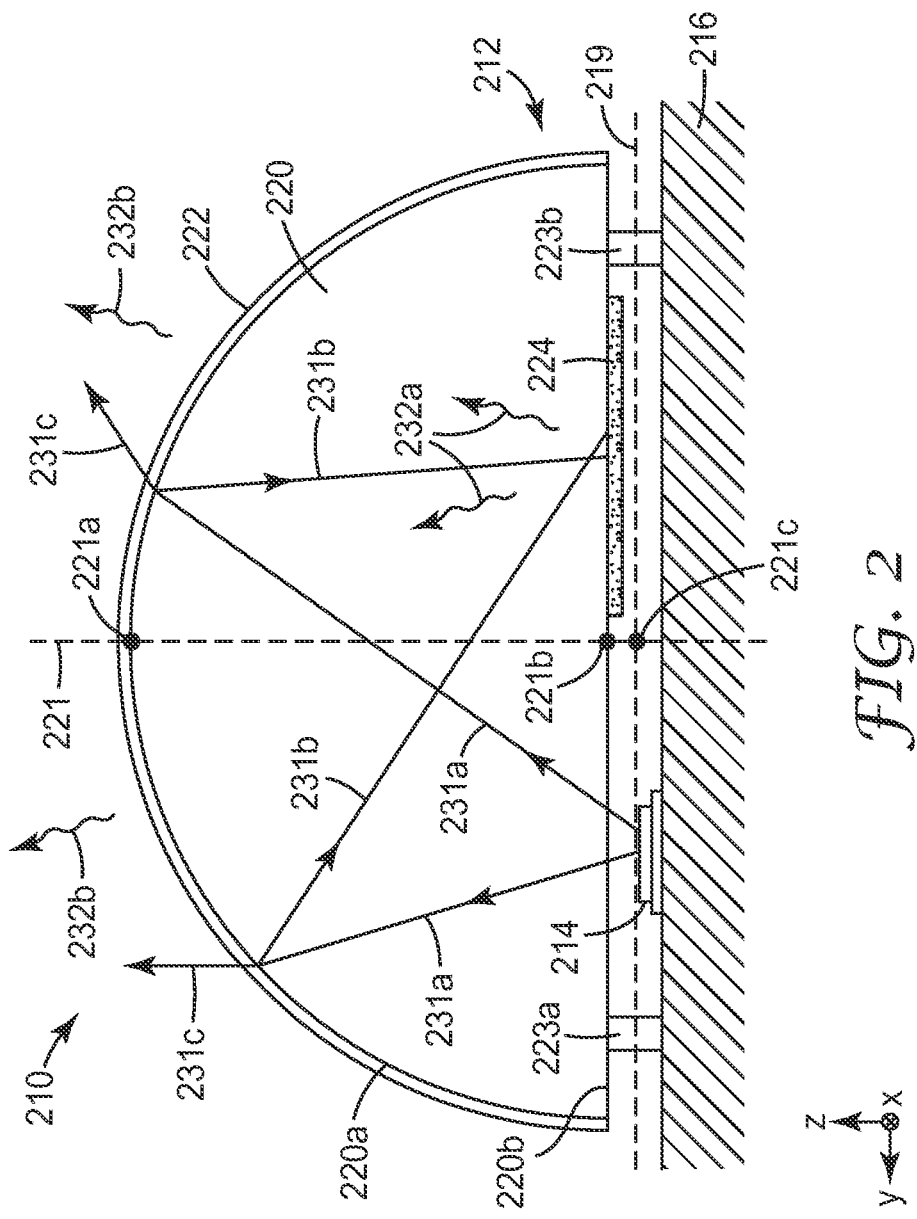
FIG. 2 is a schematic side or sectional view of a broadband light source including a lens assembly.

FIG. 2 shows a broadband light source 210 that may be the same as or similar to source 110 of FIG. 1, but the schematic side or sectional view of FIG. 2 allows the reader to more easily understand how the constituent components of the lens assembly are related to each other, and how the lens assembly relates to the LED(s). Again for reference purposes, the source 210 is depicted in relation to an xyz Cartesian coordinate system. The source 210 includes a lens assembly 212 positioned over an LED 214, which is carried by a substrate 216. The lens assembly 212 includes: a lens member 220 having an outer surface 220a and an inner surface 220b; a dichroic reflector 222 attached to the outer surface 220a; and a phosphor layer 224 attached to a portion of the inner surface 220b. The outer surface 220a is curved to define an optical axis 221 or axis of symmetry which intersects the outer surface 220a at a point 221a, intersects the inner surface 220b at a point 221b, and intersects a reference plane 219 (proximate the inner surface) at a point 221c. The lens member 220 also includes spacer features 223a, 223b, which may be distinct structures or part of a continuous ring, to maintain the lens in a stable position in close proximity to the LED. If the LED has an electrical contact such as a lead wire attached to its upper surface, a small gap may be needed between the LED and the lens 220 to prevent the lens from damaging the electrical contact.

The LED 214 emits light in all directions from its outer surface, and much of this light propagates upward (from the standpoint of FIG. 2) to the lens assembly 212. Two representative LED light rays 231a are shown emanating from the LED 214. These rays enter the lens member 220 through its inner surface 220b, propagate through the lens member, and impinge on the dichroic reflector 222 at the outer surface 220a. For simplicity, no refraction of the rays 231a is shown at the inner surface 220b. This may be the case if an index matching gel or other material is provided in the space between the LED and the lens member; otherwise, if an air gap exists in that space, refraction of the rays 231a will occur at the surface 220b. When the rays 231a encounter the dichroic reflector 222, they may be substantially and in some cases even completely reflected to produce reflected rays 231b. The dichroic reflector 222 typically however transmits at least a small portion of the incident LED light, whereupon that portion of the LED light, shown as rays 231c, is refracted out of the lens member to contribute to the overall output of the light source 210. Meanwhile, reflected LED rays 231b are, by virtue of the shape of the dichroic reflector 222 (and of the outer surface 220a), directed towards a region of the inner surface 220b that is covered by the phosphor layer 224. LED light absorbed by the phosphor layer excites the phosphor material(s) therein, and produces phosphor light 232a. The phosphor light is emitted in all directions, and much of it is transmitted by the dichroic reflector 222 as transmitted phosphor light 232b. The transmitted phosphor light 232b, in combination with any transmitted LED light 231c, provides the broadband light output of the source 210.

We will now discuss some desirable or optional characteristics and features of some of the components of light source 210, keeping in mind that such characteristics and features can pertain in like fashion to any of the other embodiments described herein, as appropriate. We begin with a discussion of some key components of the lens assembly 212: the lens member 220, the dichroic reflector 222, and the phosphor layer 224.

The lens member 220 is preferably composed of a stable, robust material having a high light transmission for the LED light and for the phosphor light. Polymer materials (plastics) and glass materials having a clear appearance, or that otherwise have high light transmission for the LED light and phosphor light, are particularly suitable. In some cases it is advantageous to use moldable material(s) and to fabricate the lens member using a molding process so that the shapes of the outer and inner surfaces 220a, 220b, can be accurately and cheaply made. In such cases a liquid precursor material may be poured or otherwise introduced into a suitably shaped mold and then solidified by cooling or by other known means to produce the lens member. Some exemplary materials for fabricating the lens member include moldable glass, polymethyl methacrylate, polycarbonate, silicone, and polyolefins, including for example acrylic resins and Zeonex™ Cyclo Olefin Polymers, marketed by Zeon Chemicals L.P.

The dichroic reflector 222 preferably conforms to the outer surface 220a of the lens member 220. Both the dichroic reflector 222 and the surface 220a may thus have a concave and/or curved shape, so that light emitted by a given LED, and reflected by the reflector 222, is directed predominantly onto a localized portion of the phosphor layer associated with that LED. In some cases, these elements may be precisely or substantially hemispherical. In some cases, they may be or approximate a partially spherical shape other than a hemisphere. In some cases, they may be piecewise concave and/or piecewise curved, as in the case of domed structure formed from an arrangement of smaller distinct flat or curved facets. In some cases, they may be partitioned, as discussed further below in connection with FIGS. 8, 9, and 10. The shape of the reflector 222 is preferably tailored so that light that originates from a given source point in a reference plane 219 coincident with or close to the inner surface 220b is reflectively imaged (at least roughly) onto a given image point in the same reference plane. The given source point and image point may be considered to form the endpoints of a line segment whose center substantially coincides with the intersection of the reference plane 219 and the optical axis 221, i.e., whose center substantially coincides with the point 221c. When the reflector 222 is shaped in this way, light from a given LED situated immediately beneath the lens assembly 212, and close to the inner surface 220b and to the reference plane 219, is reflected by the dichroic reflector to produce an image, spot, or similar localized area of increased LED light intensity on a particular portion of the phosphor layer that is exclusively or at least predominantly associated with the given LED.

Dichroic reflectors are also sometimes referred to as dichroic mirrors or dichroic filters. They are designed to have a high reflectivity and low transmission for some optical wavelengths, and a low reflectivity and high transmission for other optical wavelengths. Such reflectors ordinarily have negligible absorption, such that any light that is not reflected is substantially transmitted, and vice versa, at least over visible, near infrared, and near-ultraviolet wavelengths. Such reflectors comprise stacks of optically thin microlayers, typically in an alternating arrangement of materials having a large refractive index mismatch, such as alternating layers of silicon dioxide and titanium dioxide, but other suitable inorganic or organic materials may also be used. Such reflectors may be made by vacuum deposition of the alternating layers on a glass or other suitable substrate, e.g., directly on the outer surface 220a of the lens member 220, or on a film or substrate that can be subsequently applied to the outer surface 220a. Alternatively, suitable reflective films may be made by a continuous process that may involve coextrusion of alternating polymer materials and stretching the resulting multilayer polymer web, e.g. as described in U.S. Pat. No. 5,882,774 (Jonza et al.) and U.S. Pat. No. 6,783,349 (Neavin et al.). Regardless of the materials used in the dichroic reflector and the method of manufacture used, the reflector is provided with a layer thickness profile for the stack of microlayers that is tailored to provide the desired reflection characteristics as a function of wavelength, as described elsewhere herein. Reference in this regard is made to U.S. Pat. No. 6,967,778 (Wheatley et al.). The thickness profile may be tailored to provide a dichroic reflector that operates as a long pass filter or a notch filter, for example, whereby relatively long wavelength phosphor light is substantially transmitted over a range of incidence angles, and relatively short wavelength LED light is predominantly reflected. The dichroic reflector may for example have a transmission of at least 50%, or at least 60%, or at least 70% for the phosphor light. The dichroic reflector may in some cases substantially reflect visible blue light and substantially transmit visible magenta light. In some cases the dichroic reflector may be or comprise a multilayer mirror film, a reflective polarizer, and/or a partially polarizing reflector such as a mirror that, at a given wavelength, reflects orthogonal polarization states differently.

The reflective and transmissive properties of a dichroic reflector typically change as the incidence angle of light impinging on the reflector changes. For example, the dichroic reflector 222 may have a greater transmission for LED light rays that are obliquely incident on the reflector compared to LED light rays that are normally incident on the reflector. This characteristic may be used to produce a remote phosphor solid state light source whose output color can be adjusted by controlling the relative drive strengths of multiple LEDs arranged beneath the lens assembly, as discussed more fully in commonly assigned pending PCT Application No. PCT/US2011/065780.

The phosphor layer 224 contains one or more suitable phosphor materials that fluoresce or otherwise emit light that is Stokes shifted relative to the absorbed LED light. The phosphor material preferably absorbs light in a range that overlaps in wavelength with the emission spectrum of the LED, such that the LED can excite the phosphor and cause it to fluoresce or otherwise emit phosphor light. In many cases, a given phosphor material may absorb light in the ultraviolet, blue, and/or blue-green portion of the electromagnetic spectrum, and may emit light in the visible or near-visible region. The emitted phosphor light is typically broadband, e.g., it may have a spectral width of at least 100 nanometers. The broadband phosphor light may be distributed in a continuous broad band, or it may have a spiked distribution as in the case of a collection of spaced-apart narrow emission lines, or it may be a combination of narrow emission lines and a continuous broad band. Exemplary phosphor materials include known fluorescent dyes and phosphors. Cerium-doped yttrium aluminum garnet (Ce: YAG) is one example of a phosphor that may be used. Other rare-earth doped garnets or other rare-earth doped materials may also be suitable, e.g., europium- and/or strontium-doped silicates, nitrides, and aluminates, depending on design details and constraints of the light source. Suitable phosphor materials may include organic and inorganic fluorescent or phosphorescent materials, such as doped inorganic oxides or nitrides, quantum dots, and semiconductors including II-VI and III-V materials.

Figure 3:
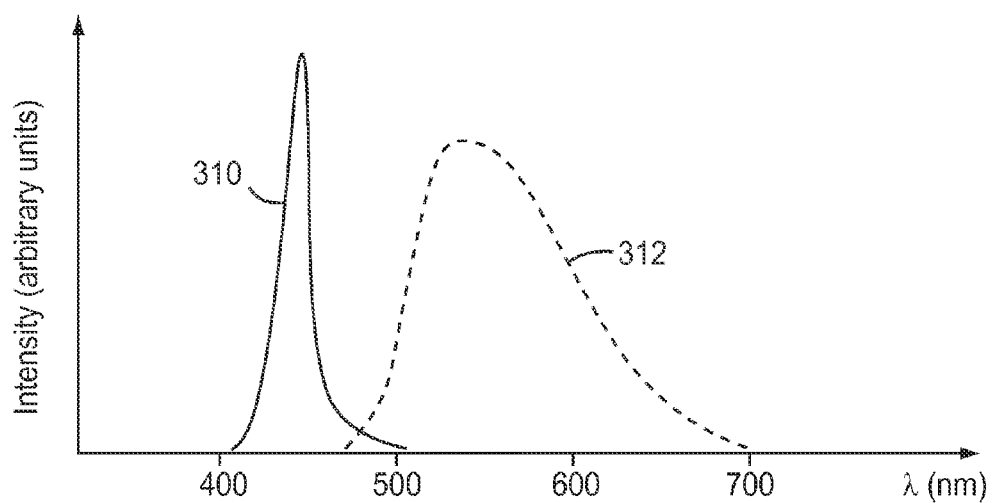
FIG. 3 is an idealized graph of the spectral intensity distributions of an exemplary blue LED and an exemplary phosphor.

A typical phosphor light emission spectrum is depicted in FIG. 3 as curve 312. Also shown is a typical LED emission spectrum, labeled as curve 310. These curves are meant to be representative of typical components, and are not necessarily intended to be limiting. As shown in the figure, for a given LED/phosphor pair, the phosphor light is generally distributed at longer wavelengths than the LED light. In cases where the LED 214 emits blue light, and where the dichroic reflector 222 transmits some of this light, the phosphor layer 224 can be tailored to emit yellow phosphor light, so that the combination of the blue LED light and yellow phosphor light provides nominally white light.

Turning our attention to components disposed beneath the lens assembly 212, the LED 214 can be any suitable LED, now known or later developed, whose output light is capable of exciting the phosphor layer 224. As mentioned above, the LED may emit light of a relatively short wavelength, e.g., primarily blue light and/or ultraviolet light, although in some cases blue-green or green light may also be used. In order to mount the LED close to the lens member 220 (and to the inner surface 220b), it is sometimes desirable to use an LED having a low-profile package, e.g., a flip-chip LED package in which both electrical contacts are provided on the bottom or mounting surface of the LED.

The substrate 216 that carries the LED 214 and other components can be of any suitable design. The substrate may be flexible or rigid, as desired. The substrate may also include one or more conductive traces, and/or holes or "vias", by which electrical connection can be made to the LEDs or other electronic components of the light source. Electrical connections can also be made by wire bonds or other suitable means, which are not depicted in the drawing. The substrate may also function as a heat sink, or may couple to a separate heat sink, so that the LED 214 and the phosphor 224 can be maintained at reasonable operating temperatures.

Figure 4:
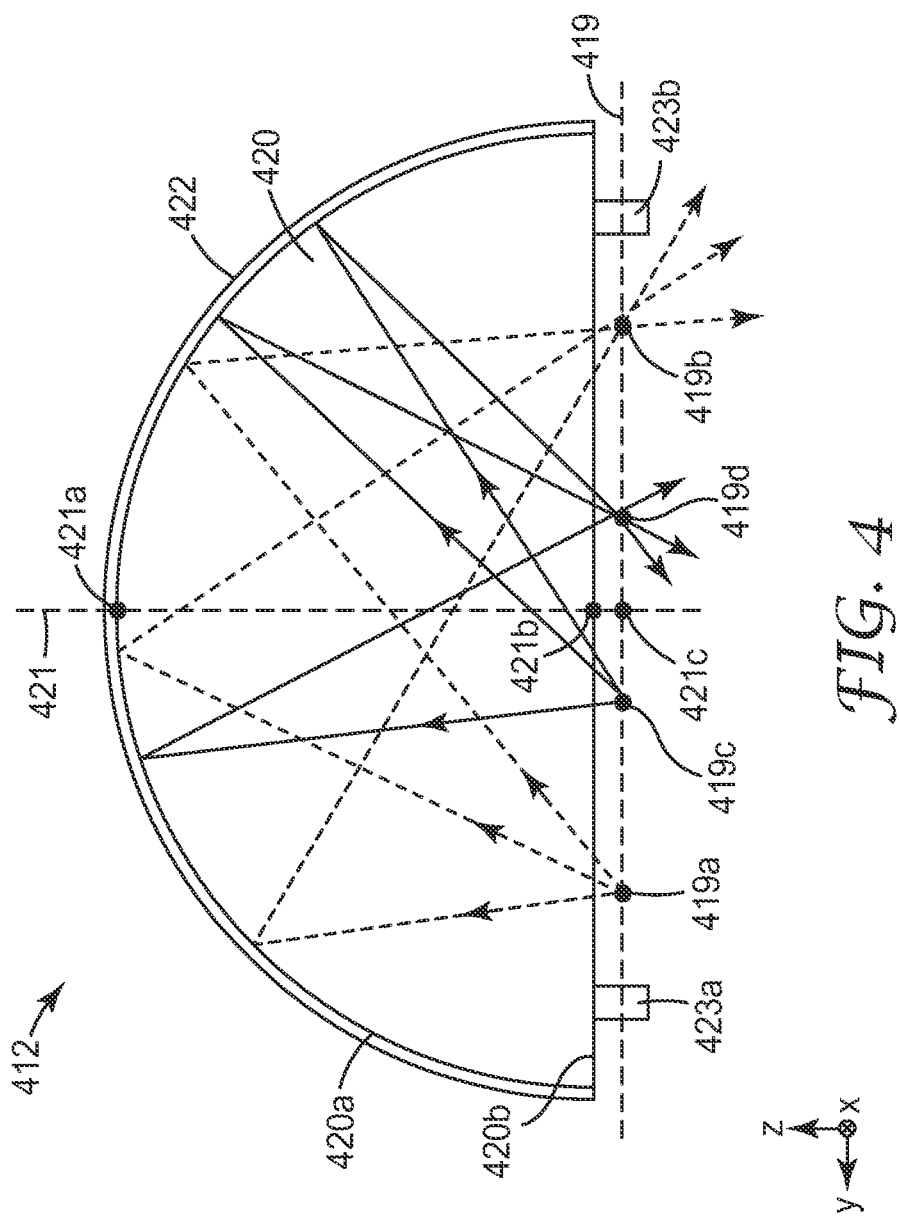
FIG. 4 is a schematic side or sectional view of a lens assembly.

Turning now to FIG. 4, we see there a schematic side or sectional view of a lens assembly 412. The assembly 412 may be the same as or similar to the lens assemblies of FIGS. 1 and 2, and corresponding parts may have corresponding features and attributes. The phosphor layer, the LED, and the substrate are however omitted from the figure so that the characteristics of the concave dichroic reflector can be more easily described and understood.

Thus, in FIG. 4, the lens assembly 412 includes a lens member 420 having an outer surface 420a and an inner surface 420b; and a dichroic reflector 422 attached to the outer surface 420a. A phosphor layer (such as layer 224 of FIG. 2) would typically be attached to a portion of the inner surface 420b. The outer surface 420a is curved or otherwise shaped to define an optical axis 421 or axis of symmetry which intersects the outer surface 420a at a point 421a, intersects the inner surface 420b at a point 421b, and intersects a reference plane 419 proximate the inner surface at a point 421c. The lens member 420 also includes spacer features 423a, 423b, which may be the same as or similar to the spacer features of FIG. 2.

The reference plane 419 may be characterized as a plane that is at least approximately imaged onto itself by the dichroic reflector, ignoring the effect of any phosphor layer that may be attached to the inner surface. The position of this plane is contingent on at least the shape of the dichroic reflector and the shape of the lens member. In exemplary embodiments, the reference plane 419 is relatively close to the inner surface 420b of the lens member. The minimum separation between the reference plane and the inner surface (e.g. the distance between points 421b and 421c) may be expressed in terms of the maximum transverse or lateral dimension D (e.g., a diameter) of the lens member: for example, the separation may be less than D/2, or less than D/5, or less than D/10. The separation may in some cases be zero. Note that the reference plane may be disposed on either side of the inner surface 420b, or may be coincident with such surface. Note also that the inner surface can be planar in some embodiments but can be non-planar in other embodiments.

We may select a point in this reference plane as a hypothetical source point from which LED light may be emitted. In the figure, we depict two such possible source points out of an unlimited set of possibilities: point 419a, and point 419c. Light rays are shown emanating from each of these points, such rays entering the lens member 420 at inner surface 420b, and traversing the lens member to reflect from the dichroic reflector 422 at the outer surface 420a. Due to the geometry of the reflector 422 (and the surface 420a), rays emanating from point 419a are focused, concentrated, or imaged at an image point 419b, and rays emanating from point 419c are focused, concentrated, or imaged at an image point 419d. Note that the focusing, concentrating, or imaging need not be exact, and the "image points" may be regions of increased light concentration whose lateral dimensions (parallel to the reference plane) are small relative to the dimensions of the inner surface 420b, rather than being precise diffraction-limited points. Furthermore, the effect of off-axis aberrations and distortions generally cause increased blurring or increased spot size as the distance from the image point to the optical axis 421 (and from the point 421c) increases.

Each pair of corresponding source/image points, such as the pair 419a, 419b, or the pair 419c, 419d, not only lies in the reference plane 419 but also defines endpoints of a line segment whose center substantially coincides with point 421c. Stated differently, a given source point and its associated image point are disposed substantially symmetrically with respect to the optical axis 421, and with respect to the point 421c. Such an arrangement can be achieved in cases where outer surface 420a (and dichroic reflector 422) is shaped as a hemisphere or other portion of a sphere whose radius of curvature is precisely or approximately equal to the physical distance between points 421a and 421b. However, other surface shapes, including aspheric shapes, diffractive surfaces, and so forth, may alternatively be used to provide similar results. With this arrangement, an LED that is positioned beneath the lens assembly 412 close to the inner surface 420b and close to the reference plane 419, but displaced laterally from the optical axis 421 and point 421c, will produce LED light that is reflected by the dichroic reflector 422 into an image area or zone having a similar size and shape as the emitting surface of the LED, the image zone being located at or near the inner surface 420b or the reference plane 419, and the image zone and the emitting surface of the LED being disposed substantially symmetrically with respect to the optical axis 421 and the point 421c. If desired, multiple LEDs can be positioned beneath the lens assembly in this manner, and as long as phosphor material is provided to cover portions of the inner surface 420b corresponding to the image zones or points associated with the LEDs, the imaged LED light will be absorbed and re-emitted by the phosphor material as phosphor light.

Figure 5:
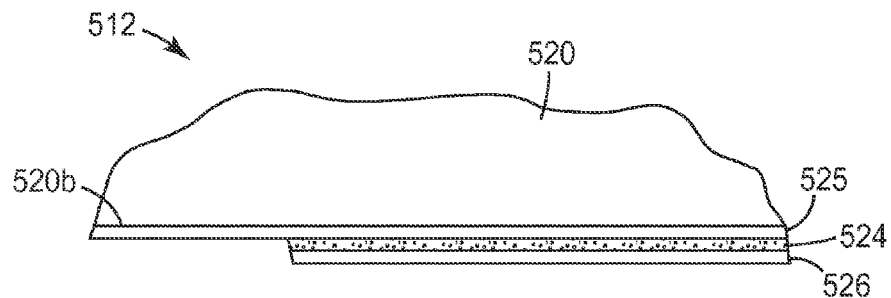
FIG. 5 is a schematic side or sectional view of a portion of a lens assembly.

A portion of a lens assembly 512 is shown schematically in FIG. 5. This lens assembly may be the same as or similar to any of those shown in FIG. 1, 2, or 4. The figure is provided to demonstrate some specific configurations of the many different configurations that are contemplated for the phosphor layer and other layers and components associated with the phosphor layer. In FIG. 5, the lens member 520 of the lens assembly 512 has an outer surface (not shown) and an inner surface 520b. Attached to the inner surface is a patterned phosphor layer 524. As shown, the phosphor layer 524 covers a portion of the inner surface 520b, and does not cover (hence it exposes) another portion of the inner surface 520b.

Preferably, the phosphor layer 524 covers any portion(s) of the inner surface that are located near image zone(s) corresponding to LED(s) that may be arranged to illuminate the lens assembly. The phosphor layer may be made from a photo-stable and thermally-stable binder with one or more phosphors dispersed therein. The binder may be a polymer, including for example silicone and/or fluoropolymers, and may be an adhesive or gel, such as a silicone adhesive or a silicone gel. The phosphor materials (phosphors) may be mixed, layered, or patterned, or a combination of two or more of these configurations. Suitable means of coating include knife coating, extrusion coating, and bar coating. Suitable means for applying a patterned coating include those used for printing, including rotogravure, intaglio, silk screen, and ink jet. One or more phosphor layers may be patterned on an unpatterned layer of a phosphor, or different areas may have predominantly one phosphor type. For example, a pixel pattern of a red-emitting phosphor and a green-emitting phosphor may be used, where each pixel is about the size of an associated LED (that drives or excites the phosphor) in at least one direction. The pixel pattern may be in the form of one-dimensional rows or a two-dimensional grid. Reabsorption losses can be reduced by spatially separating the different phosphors. The different phosphors may in some cases be separated into regions whose lateral or transverse dimension is in a range from about 2 to 20 times the thickness of the phosphor containing layer.

In the lens assembly 512 of FIG. 5, an adhesive layer 525 is provided between the phosphor layer 524 and the lens member 520. The adhesive layer preferably has high transmission and low absorption for both LED light and phosphor light. Suitable adhesive layers include acrylates and silicones. The adhesives may contain other additives that can be cured with heat or radiation. For example, a thermally cured epoxy may be mixed with a B-staged cured acrylate to form a pressure sensitive adhesive that can be cured to form a permanent bond. The adhesive may also be applied as a curable liquid, such as a silicone resin monomer with a thermally or photolytically activated catalyst. In some cases, the adhesive may provide a substantially permanent bond between the phosphor layer and the lens member. In other cases, described further below in connection with FIGS. 11 and 12, the adhesive may provide a removable bond. In this regard, the adhesive may have a bond strength that is high enough to provide good durability in the final application, but also low enough to allow one or more portions of the phosphor layer to be removed e.g. by die-cutting and peeling.

The adhesive layer 525 is shown as covering both the portions of the inner surface 520b that are covered by the phosphor layer 524 and the portions of the inner surface 520b that are exposed by the phosphor layer 524. In alternative embodiments, the adhesive layer may be limited in extent to cover only those portions of the inner surface that are also covered by the phosphor layer.

In the lens assembly 512 of FIG. 5, a reflective layer 526 is provided on the other side of the phosphor layer 524 such that the phosphor layer lies between the reflective layer 526 and the lens member 520. The reflective layer may be a broadband reflector that has a high reflectivity for both the relatively short wavelength LED light and the longer wavelength phosphor light. In that case, any LED light that propagates entirely through the phosphor layer may be reflected back into the phosphor layer to allow for increased absorption of the LED light in a phosphor layer of reduced thickness. Furthermore, any phosphor light that propagates in directions away from the lens member can be intercepted by the reflective layer and redirected back through the phosphor layer towards the lens member so as to increase the phosphor light component of the overall output of the light source. The reflective layer may be a specular reflector, a diffuse reflector, or a semi-specular reflector (combination of specular and diffuse). The reflective layer may comprise a binder and a pigment, and may contain other additives. Suitable binders include the same binder materials as those mentioned in connection with the phosphor layer. The binder used in the reflective layer may be the same as or different from the binder used in the phosphor layer. Exemplary pigments include anatase or rutile $TiO_2$. Preferably, the $TiO_2$ is passivated with a coating such as silica. Other additives can include an inorganic filler to improve thermal conductivity. Suitable fillers may include alumina, aluminum nitride, boron nitride, and/or diamond. Such fillers in the reflective layer desirably have a low absorbance of LED light and phosphor light. Suitable broadband reflectors with predominantly specular characteristics include multilayer optical films configured for high reflectivity across the visible spectrum, such as Vikuiti™ Enhanced Specular Reflector Film (ESR) marketed by 3M Company, which has greater than 98% reflectivity over the visible region. Other dielectric coating reflectors, made from optically thin layers of high and low index materials, such as nanovoided polymers or other polymers, $MgF_2$, $TiO_2$, $SiO_2$, $Al_2O_3$, and/or $ZrO_2$, may also be used. Simpler metal-coated films, such as aluminum-coated polymer films or silver-coated polymer films, may also be used. The reflectivity of a metal coating may be enhanced by, for example, adding one or more known dielectric coatings such as nanovoided polymers or other polymers, inorganic nanoparticulate filled polymers, $MgF_2$, $TiO_2$, $SiO_2$, $Al_2O_3$, and/or $ZrO_2$. A wide variety of alternative constructions to that shown in FIG. 5 are contemplated. For example, the adhesive layer 525 and/or the reflective layer 526 may be omitted. Furthermore, additional layers can be added to the constructions. Such additional layers may include one or more transparent spacer layers, structural layers, thermally conductive layers, and bonding layers.

Thus, a transparent spacer layer may also be included in the construction. Such layer is preferably disposed between the lens member and the phosphor layer. The spacer layer may be tailored to serve one or more of the following functions: it may change the optical output characteristics of the light emitted from the phosphor layer through the lens; it may displace or position the phosphor layer away from the lens member and closer to a thermally conductive substrate (e.g., substrate 116 of FIG. 1 and substrate 216 of FIG. 2); and/or it may provide a low refractive index layer between the lens member and the phosphor layer in order to increase the brightness of the device. Suitable low index coatings include fluoropolymers, silicones, and radiation curable materials that are cured in combination with a solvent, then dried to produce a low index layer.

A structural layer may also be included in the construction. The structural layer in this regard refers to a layer that is self-supporting and sufficiently thick and strong so that it can be mechanically removed (e.g. by peeling) along with portion(s) of the phosphor layer to which it is adhered, as discussed for example below in connection with FIGS. 11 and 12. Before removal, the structural layer may be scored or cut to separate portion(s) to be retained from portion(s) to be removed, whereupon the portion(s) to be removed can be mechanically removed from the lens member along with corresponding portion(s) of the phosphor layer so as to selectively expose portion(s) of the inner surface of the lens member. Suitable structural layers include polyesters, including polyethylene terephthalate or polyethylene naphthalate, fluoropolymers, polyethylene, polypropylene, and silicones. The structural layer may also be of a woven or random fibrous mat including materials such as cellulose, synthetic fibers, and ceramic or glass fibers.

A thermally conductive layer may also be included in the construction. The thermally conductive layer is preferably disposed behind the phosphor layer, such that the phosphor layer lies between the thermally conductive layer and the lens member. The thermally conductive layer may contact or otherwise couple to a thermally conductive substrate (e.g., substrate 116 of FIG. 1 and substrate 216 of FIG. 2) so as to maintain the phosphor layer at a lower operating temperature. The thermally conductive layer may be made from polymer layers, particularly those filled with adequate amounts of thermally conductive powder(s) or material(s) such as alumina, silica, boron nitride, and/or aluminum nitride. The polymer layer may be a homopolymer such as a silicone or an acrylate, or a mixture of polymers, or a B-stage curable material such as a mixture of a thermally cured epoxy with a radiation cured acrylate.

A bonding layer (other than the adhesive layer 525 already discussed) may also be included in the construction. For example, a primer layer may be included between adjacent functional layers so as to enhance bonding between such layers.

The functions of two or more layers in the sandwich construction of which the phosphor layer is a part may be combined into a single layer. For example, an adhesive layer may also serve as a transparent spacer layer. Alternatively or in addition, any of the layers described or depicted as a single layer can be split or duplicated so as to provide two or more such distinct layers within the sandwich construction.

In any of the disclosed embodiments, the phosphor layer may be part of a phosphor assembly that also includes at least a broadband reflector such as reflective layer 526. The broadband reflector may have a reflectivity for LED light and for phosphor light of at least 90, 94, or 98%. Further, the degree of transparency or of transmission of the phosphor layer to LED light can be tailored to increase the broadband light output of the lighting system. Such increase can be achieved by decreasing the amount of phosphor used in the phosphor layer. The single pass transmission T of the phosphor layer to the LED light may be from 30 to 65%, or from 35 to 60%, or from 40 to 50%. Further details on exemplary phosphor assemblies are discussed more fully in commonly assigned PCT Application No. PCT/US2011/065784.

Figure 6:
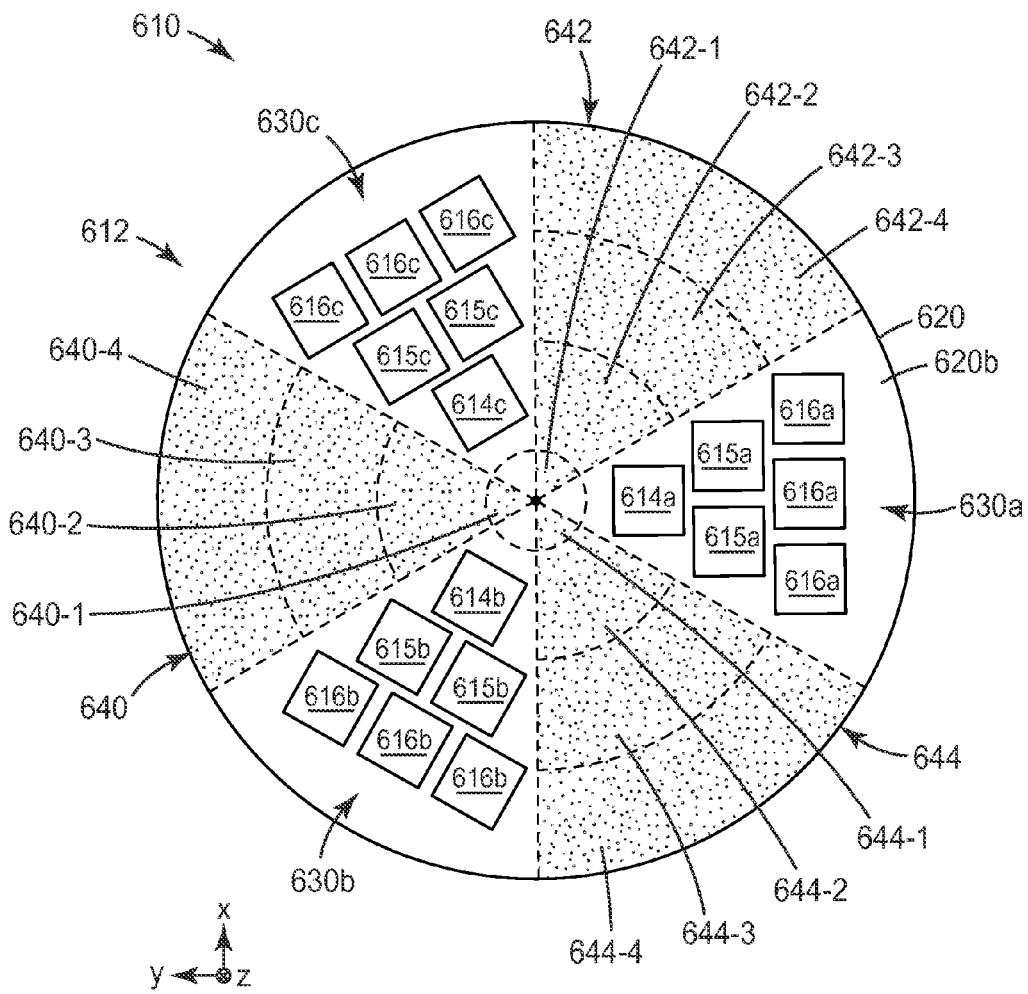
FIG. 6 is a schematic plan view of a portion of a broadband light source with lens assembly.

FIG. 6 shows one particular example of how the phosphor layer may be patterned to cover selected portions of the inner surface of the lens member, and how groups of LEDs can be positioned proximate exposed portions of the inner surface such that LED light that is reflected by the dichroic reflector can illuminate the phosphor layer. The figure may be considered to be a plan view of a broadband light source 610 as seen from a viewing plane slightly below the lens assembly and looking upward towards the lens assembly. The light source 610 includes a lens assembly 612 and groups 630a, 630b, 630c of neighboring LEDs which are disposed on a substrate (not shown) proximate the lens assembly. The lens assembly 612 includes: a lens member 620 having an outer surface (not shown) and an inner surface 620b; a dichroic reflector (not shown) disposed on the outer surface of the lens member; and a phosphor layer having three distinct portions 640, 642, 644 arranged in wedge-shaped sectors, the phosphor layer being patterned to cover the inner surface 620b in the wedge-shaped portions and to expose the inner surface in the remaining (complementary) wedge-shaped regions occupied by the LED groups. The characteristics of the light source 610 and of its respective components may be the same as or similar to characteristics of corresponding components discussed elsewhere herein. For example, the outer surface of the lens member 620 may be shaped to define an optical axis that is perpendicular to the plane of the figure and that passes through the point (not labeled) in the center of the figure.

A total of eighteen LEDs are shown in FIG. 6, the LEDs being arranged in the three wedge-shaped groups 630a, 630b, 630c of six neighboring LEDs, each group of neighboring LEDs disposed near a wedge-shaped region of the inner surface 620b. The layout of the three wedge-shaped groups of LEDs, and the depicted number and orientation of LEDs in each group, is one of many possible arrangements, and should not be construed in a limiting way. For example, shapes other than wedge-like shapes are also contemplated.

In this plan view, the groups of neighboring LEDs are separated from each other by the wedge-shaped portions 640, 642, 644 of the phosphor layer. Further, each group of neighboring LEDs resides in a wedge-shaped region that is generally opposite one of the wedge-shaped portions of the phosphor layer, relative to the point in the center of the figure. Each pair of a wedge-shaped region of LEDs and its corresponding wedge-shaped portion of the phosphor layer may also be generally symmetrical with respect to the central point in the figure. By configuring the dichroic reflector such that the optical axis passes through the central point, and by selecting a suitable radius of curvature of the dichroic reflector, the portion of LED light from each wedge-shaped group of neighboring LEDs that is reflected by the dichroic reflector can be imaged (at least approximately) onto its corresponding wedge-shaped portion of the phosphor layer. The neighboring LEDs in each of the three LED groups are also shown to be arranged at different radial distances (measured parallel to the x-y plane) from the central point. In the depicted arrangement, for example, one LED in each group (see LEDs 614a, 614b, 614c) is disposed closest to the central point, three LEDs in each group (see LEDs 616a, 616b, 616c) are disposed farthest from the central point, and two LEDs in each group (see LEDs 615a, 615b, 615c) are disposed at an intermediate distance from the central point. The dichroic reflector reflects at least some light from the various LEDs onto selected portions of the phosphor layer so that the different LEDs primarily excite different subportions of the phosphor layer. If we consider the phosphor portions 640, 642, 644 as comprising subportions at different radial distances from the central point, i.e. portion 640 comprising subportions 640-1, 640-2, 640-3, 640-4, portion 642 comprising subportions 642-1, 642-2, 642-3, 642-4, and portion 644 comprising subportions 644-1, 644-2, 644-3, 644-4, the dichroic reflector may reflect LED light from the various LEDs preferentially onto the various phosphor layer subportions as follows:

light from LED 614a onto phosphor subportion 640-2;
light from LEDs 615a onto phosphor subportion 640-3;
light from LEDs 616a onto phosphor subportion 640-4;
light from LED 614b onto phosphor subportion 642-2;
light from LEDs 615b onto phosphor subportion 642-3;
light from LEDs 616b onto phosphor subportion 642-4;
light from LED 614c onto phosphor subportion 644-2;
light from LEDs 615c onto phosphor subportion 644-3; and
light from LEDs 616c onto phosphor subportion 644-4.

The reader will keep in mind that the preferential reflection of LED light should not be so narrowly construed as to require all of the reflected LED light from a given LED to impinge on the specified phosphor subportion, and that some reflected LED light from such LED may also impinge on other phosphor subportions and/or on other LEDs or other elements of the source.

In one embodiment of the light source 610, all eighteen LEDs may emit LED light according to a same LED emission spectrum, and the phosphor layer may be of uniform composition and structure such that the composition and structure of the phosphor layer is the same throughout and amongst the wedge-shaped portions 640, 642, 644. In another embodiment, different colors can be achieved for different broadband light portions by using different compositions and/or structures for portions of the phosphor layer associated with different LEDs. Additionally or in the alternative, one, some, or all of the wedge-shaped portions 640, 642, 644, may have a composition and/or structure that is different at different radial distances from the optical axis of the dichroic reflector or the central point (not labeled). In another embodiment, different colors can be achieved for different broadband light portions by selecting individual LEDs that have different emission spectra, and then controlling or adjusting the relative degree to which LEDs of different emission properties are energized. Further details in this regard may be found in the commonly assigned PCT Application No. PCT/US2011/065780 referenced elsewhere herein.

Figure 7:
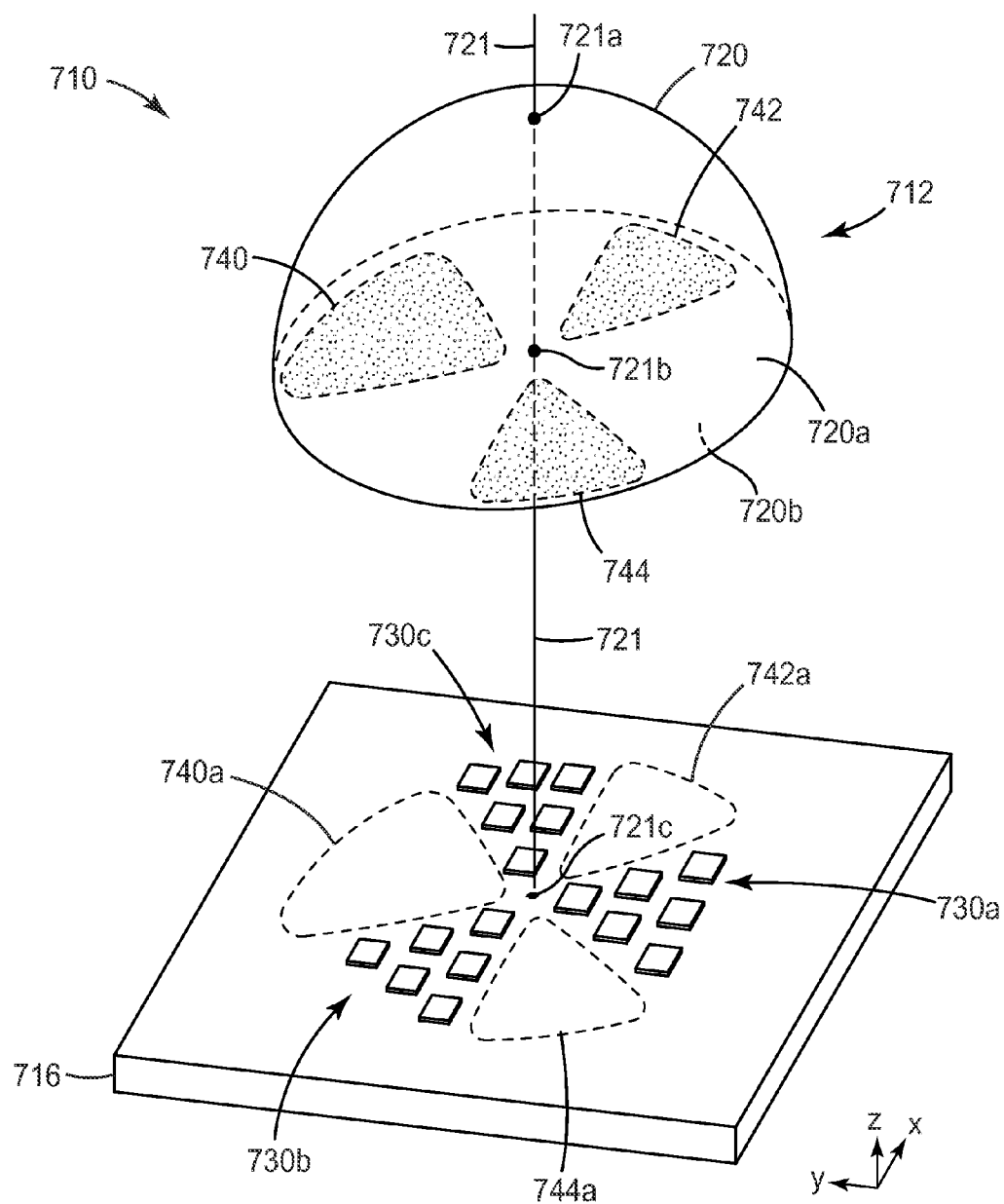
FIG. 7 is a schematic perspective exploded view of an exemplary broadband light source including a lens assembly.

FIG. 7 illustrates in an exploded view how a broadband solid state light source 710 can be made by mating a lens assembly with one or more LED devices. The characteristics of the light source 710 and of its respective components may be the same as or similar to characteristics of corresponding components discussed elsewhere herein.

In the light source 710, a lens assembly 712 is mated with an LED assembly. The lens assembly includes: a lens member 720 having an outer surface 720a and an inner surface 720b, the outer surface defining a symmetry axis or optical axis 721 which intersects the outer surface at point 721a and intersects the inner surface at point 721b; a dichroic reflector disposed on the outer surface 720a; and a phosphor layer having three distinct portions 740, 742, 744 arranged in wedge-shaped sectors, the phosphor layer being patterned to cover the inner surface 720b in the wedge-shaped portions and to expose the inner surface in the remaining (complementary) wedge-shaped regions.

The LED assembly, to which the lens assembly is mated, includes groups 730a, 730b, 730c of neighboring LEDs which are disposed on a substrate 716. Again, the layout of the three wedge-shaped groups of LEDs, and the depicted number and orientation of LEDs in each group, is one of many possible arrangements, and should not be construed in a limiting way. The groups of neighboring LEDs are separated from each other by wedge-shaped regions 740a, 742a, 744a of the substrate 716, which regions become aligned with phosphor layer portions 740, 742, 744, respectively, when the lens assembly 712 is coupled to (e.g., brought into contact with, or otherwise brought into close proximity with) the LED assembly. When such coupling is accomplished, the arrangement of LEDs and phosphor layer portions may be substantially as shown and described in connection with FIG. 6. Note that the optical axis 721 of the lens assembly 712 passes through a point 721c on the substrate, corresponding to a central point amidst the LED groups 730a, 730b, 730c and the regions 740a, 742a, 744a.

We contemplate a variety of different configuration styles for the outer surface of the lens member. In some cases, the outer surface may be partitioned to provide particular design features that may be advantageous in certain applications. Lens assemblies having partitioned outer surfaces are shown schematically in FIGS. 8, 9, and 10. The features of these embodiments may be employed in other embodiments discussed herein, and vice versa.

Figure 8:
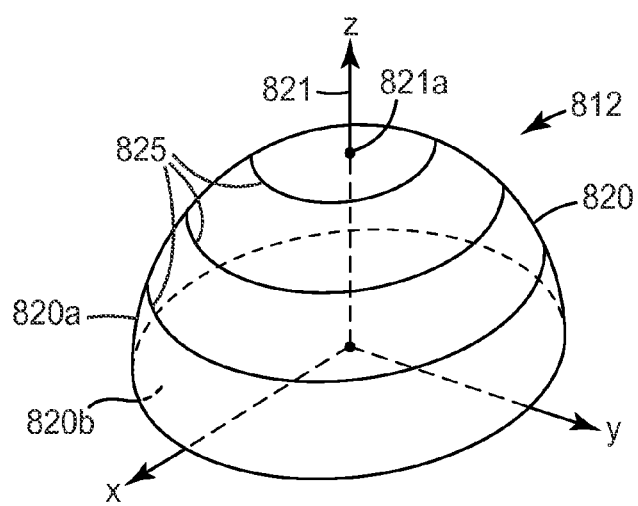
FIGS. 8, 9, and 10 are schematic perspective views of lens assemblies each having a partitioned outer surface.

In FIG. 8, a lens assembly 812 includes a lens member 820 having an outer surface 820a and an inner surface 820b. The outer surface is partitioned by circular boundary features 825, which boundary features 825 may be or comprise one or more grooves or notches and/or one or more ridges or protuberances. A dichroic reflector is deposited or otherwise attached to some or all of the outer surface 820a, but may be absent at the boundary features 825. Partitioning of the outer surface 820a can serve several purposes: by dividing the single uninterrupted surface area dichroic coating into a contiguous set of smaller uninterrupted areas, the mechanical impact of a thermal expansion mismatch between the lens member 820 and the dichroic coating can be reduced; furthermore, the boundary features can provide a controlled amount of light scattering from uncoated surfaces. Despite the presence of the boundary features 825, the outer surface 820a is still preferably shaped in such a way as to define a symmetry axis or optical axis 821, which intersects the outer surface 820a at an apex point 821a, and to provide the focusing or imaging properties discussed elsewhere herein.

Figure 9:
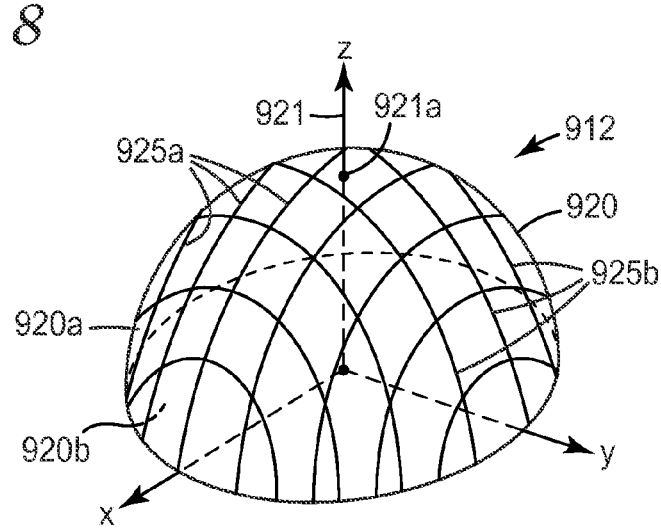

In FIG. 9, a lens assembly 912 includes a lens member 920 having an outer surface 920a and an inner surface 920b. The outer surface is partitioned by arcuate boundary features 925a, 925b, which boundary features may be or comprise one or more grooves or notches and/or one or more ridges or protuberances. The boundary features 925a lie generally in planes parallel to the x-z plane, and the boundary features 925b lie generally in planes parallel to the y-z plane, thus intersecting the boundary features 925a. A dichroic reflector is deposited or otherwise attached to some or all of the outer surface 920a, but may be absent at the boundary features 925a, 925b. Partitioning of the outer surface 920a can serve several purposes, including those discussed in connection with FIG. 8. Despite the presence of the boundary features 925a, 925b, the outer surface 920a is still preferably shaped in such a way as to define a symmetry axis or optical axis 921, which intersects the outer surface 920a at an apex point 921a, and to provide the focusing or imaging properties discussed elsewhere herein.

Figure 10:
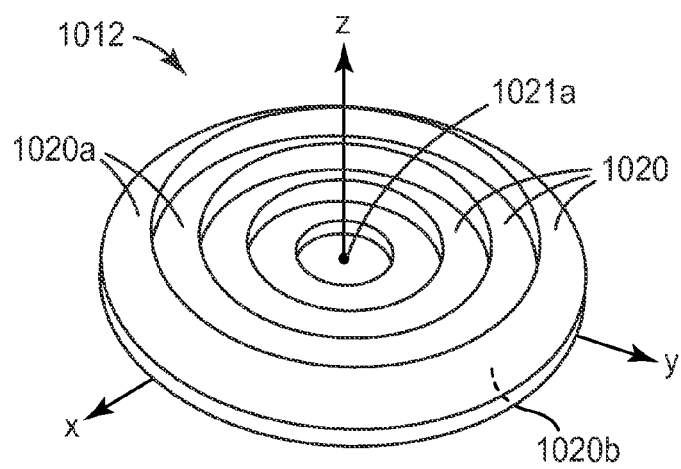

In FIG. 10, a lens assembly 1012 includes a lens member 1020 having an outer surface 1020a and an inner surface 1020b. The outer surface is partitioned by circular boundary features similar in some respects to those of FIG. 8. In FIG. 10, however, the boundary features each include a steep connecting wall portion between adjacent portions of the outer surface, thus producing a Fresnel-lens structure. A dichroic reflector is deposited or otherwise attached to some or all of the outer surface 1020a, but may be absent at the boundary features. Notice that the steep wall portions allow the different portions of the outer surface to be translated along the z-axis such that the overall height or thickness of the lens member 1020 is substantially less than that of the lens members of FIGS. 8 and 9. Partitioning of the outer surface 1020a can thus not only serve the purposes discussed in connection with FIGS. 8 and 9, but also to reduce the overall height of the lens member and lens assembly. Despite the presence of the boundary features, the outer surface 1020a is still preferably shaped in such a way as to define a symmetry axis or optical axis 1021, which intersects the outer surface 1020a at an apex point 1021a, and to provide the focusing or imaging properties discussed elsewhere herein.

Any of the lens assemblies disclosed herein can be tailored in such a way as to permit fast, convenient, and precise patterning of the phosphor layer, and of other layers if desired, in preparation for coupling the lens assembly to an LED assembly. Such a design approach allows a single type of lens assembly to be used with multiple different LED assemblies, e.g., LED assemblies that have different numbers of LEDs, and/or different spatial arrangements or layouts of the LEDs on the substrate. Identical pre-patterned lens assemblies can be used with both such LED assemblies by patterning the phosphor layer of one of the lens assemblies with a first pattern that is compatible with a first such LED assembly, and patterning the phosphor layer of another of the lens assemblies with a second pattern that is compatible with a second such LED assembly but not the first LED assembly. Lens assemblies with these capabilities can help to reduce inventories, increase manufacturing flexibility, and reduce costs for solid state lighting manufacturers.

Figure 11:
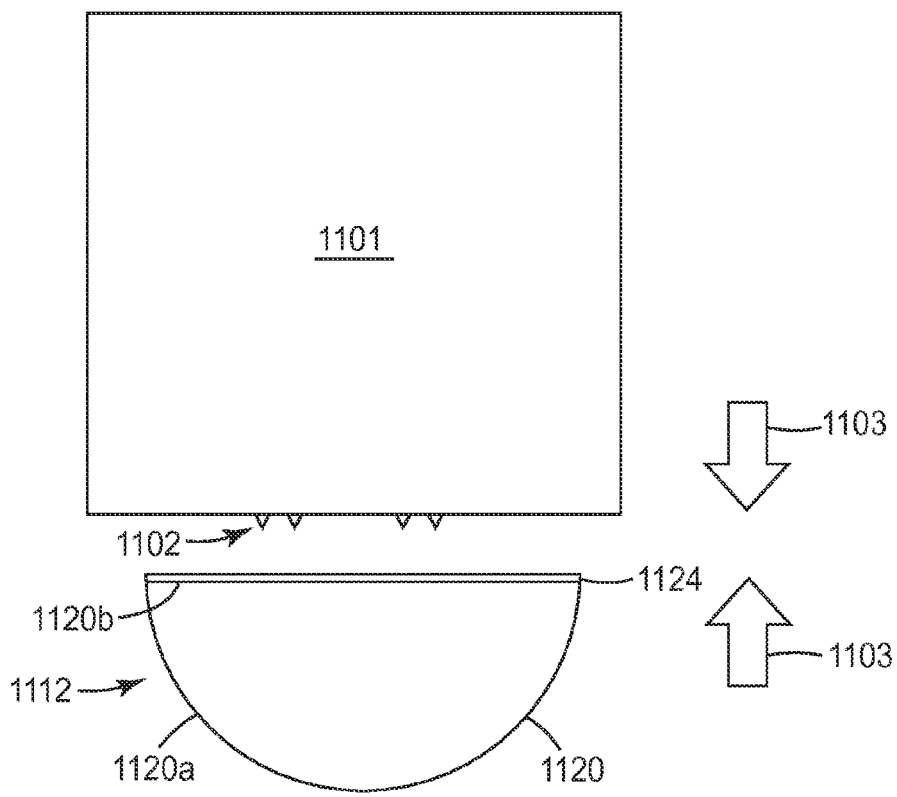
FIG. 11 is a schematic side or sectional view of a lens assembly in combination with a die cutting tool.

FIG. 11 illustrates a lens assembly 1112 that incorporates this design flexibility. A lens assembly 1112 includes a lens member 1120 having an outer surface 1120a and an inner surface 1120b. A dichroic reflector (not separately labeled) is deposited onto, or otherwise covers, some or all of the outer surface 1120a. A phosphor layer 1124 is removably bonded or otherwise removably attached to the inner surface 1120b in such a way as to allow a portion of it to be physically separated from the inner surface, e.g. by peeling, while a remaining portion of the phosphor layer remains attached to the inner surface. Note that although not depicted in FIG. 11, any of the other layers discussed in connection with FIG. 5 above can also be included in the construction. For example, an adhesive layer may be sandwiched between the phosphor layer and the inner surface, the adhesive layer having a bond strength that is high enough to provide good durability in the final application, but also low enough to allow one or more portions of the phosphor layer to be removed e.g. by die-cutting and peeling. The removed portion of the phosphor layer exposes a corresponding portion of the inner surface 1120b so that one or more LEDs can inject light into those exposed portions of the lens member; the remaining portion of the phosphor layer covers a corresponding portion of the inner surface so that it can receive LED light reflected by the dichroic reflector.

The selective removal of the phosphor layer, which has the effect of patterning the phosphor layer, can be carried out by scoring or otherwise cutting the phosphor layer in a desired shape and then separating the scored portion e.g. by peeling. Such an operation is depicted schematically in FIG. 11. There, a die-cutting tool 1101 having cutting members 1102 is pressed against the lens assembly 1112 such that the cutting members pierce the phosphor layer 1124 and/or adjacent layer(s) at the inner surface 1120b of the lens member 1120. The opposing forces involved in this operation are depicted as arrows 1103. The cutting members 1102 on the tool 1101 are configured into a particular shape which represents a desired exposed area shape or a desired covered area shape for the inner surface 1120b. After retracting the tool 1101 from the lens assembly 1112, one portion of the phosphor layer is physically separated from the inner surface 1120b, e.g. by peeling, while the remaining portion of the phosphor layer remains attached to the inner surface. The boundary between the separated portion of the phosphor layer and the remaining portion of the phosphor layer is provided by the scored portion of the phosphor layer created by the cutting members 1102 of the cutting tool 1102. Replacing the cutting tool 1101 with a cutting tool having different cutting members allows the lighting device manufacturer to produce a different exposed area shape using the same initial lens assembly 1112 so that the resulting lens assembly can be used with a different LED assembly.

Figure 12:
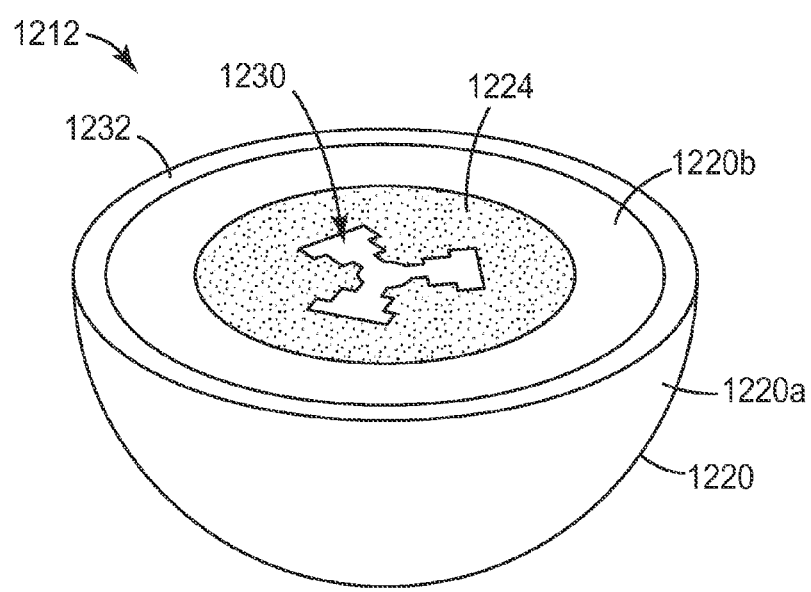
FIG. 12 is a perspective view of a lens assembly having a patterned phosphor layer.

A lens assembly 1212 whose phosphor layer has been patterned is shown in schematic perspective view in FIG. 12. This lens assembly may be the same as or similar to that of FIG. 11 after die-cutting and peeling, and the features of the lens assembly 1212 may be employed in any of the embodiments discussed herein, and vice versa. The assembly 1212 comprises a lens member 1220 having an outer surface 1220a and an inner surface 1220b. The assembly also includes a dichroic reflector disposed on all or a portion of the outer surface 1220a, and a phosphor layer 1224 that has been patterned so as to cover a portion of the inner surface 1220b and to expose another portion 1230 of the inner surface 1220b. The shape of the boundary of portion 1230 may be the same shape as the cutting members of a die-cutting tool such as that of FIG. 11. After the scored portion of the phosphor layer has been peeled away, the exposed portion 1230 results. The lens assembly 1212 as fabricated may then be mated with an LED assembly such as that shown in the lower part of FIG. 7, to provide a remote phosphor broadband solid state light source.

Figure 13:
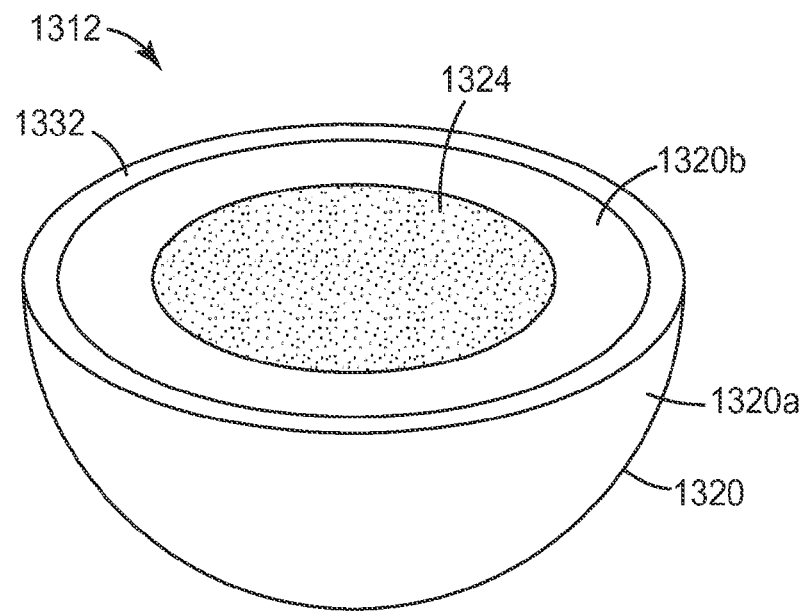
FIG. 13 is a perspective view of a lens assembly that includes a lift-off ring.
Figure 14:
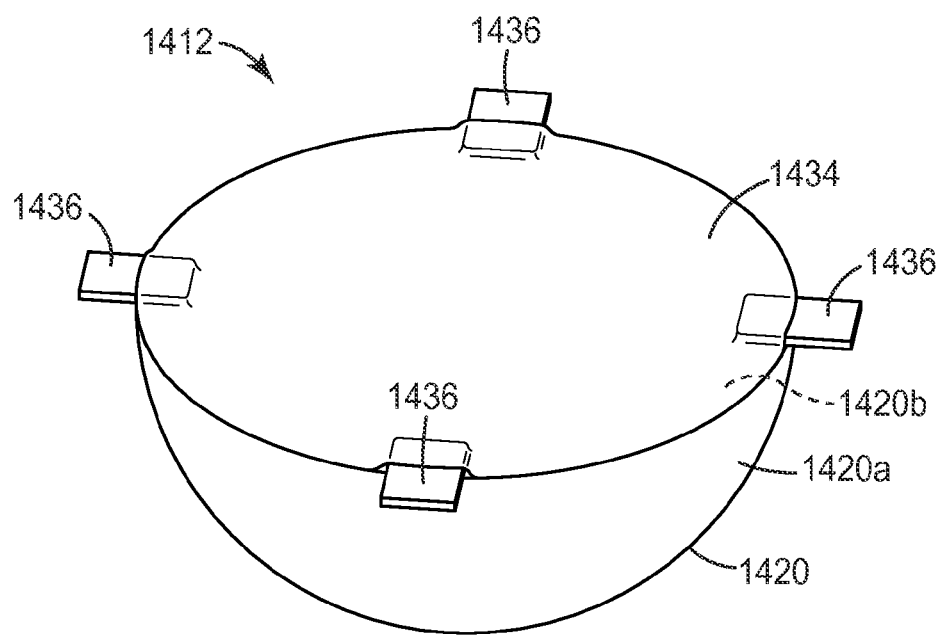
FIG. 14 is a perspective view of a lens assembly having a tabbed lift-off film.

The lens assembly 1212 also includes a ring-shaped tab 1232. The tab 1232 may be configured as discussed below in connection with FIG. 13 to facilitate removal of die-cut areas of the phosphor layer. FIGS. 13 and 14 depict additional lens assemblies, the features of which may be employed in any of the embodiments discussed herein, and vice versa. In FIG. 13, a lens assembly 1312 includes a lens member 1320 having an outer surface 1320a and an inner surface 1320b. The assembly also includes a dichroic reflector disposed on all or a portion of the outer surface 1320a, and a phosphor layer 1324 attached to a portion of the inner surface 1320b. The phosphor layer 1324 may be patterned in a manner similar to that shown in FIGS. 11 and 12, or in any other suitable way. The lens member 1312 includes a ring-shaped tab 1332. The tab 1332 can be configured to facilitate lift-off of a portion of the phosphor layer after a patterning operation such as die-cutting. Such a ring may for example be made from a polyester film with a pressure-sensitive adhesive bonded to the inner surface of lens member 1320, and a phosphor layer may also be applied to the inner surface of lens member 1320 such that the phosphor layer is also attached to the polyester film. The ring facilitates later removal of die-cut areas of the phosphor layer.

In an alternative construction, the ring may be bonded to the surface of the phosphor layer after the phosphor layer has been bonded to the inner surface of lens member 1320. Suitable materials for constructing the ring include polymer films and nonwoven mats. The film or mat may be bonded directly to the phosphor coating, or may be bonded by an adhesive layer.

In FIG. 14, a lens assembly 1412 includes a lens member 1420 having an outer surface 1420a and an inner surface 1420b. The assembly 1412 also includes a dichroic reflector disposed on all or a portion of the outer surface 1420a, and a phosphor layer attached to a portion of the inner surface 1420b. The assembly 1412 also includes a structural layer 1434 which covers the phosphor layer and the inner surface 1420b. The structural layer 1434 is attached to discrete tabs 1436 which can be grasped to facilitate lift-off of a portion of the phosphor layer after patterning. For example, the structural layer 1434, the phosphor layer, and the adhesive layer (if separately present) may be scored with a die-cutting tool, and an unwanted portion of the phosphor layer may then be separated from the inner surface 1420b by lifting away a portion of the structural layer 1434 using the tabs 1436. The tabs may be made from polymer films or nonwoven mats. The film or mat may be bonded directly to the phosphor coating, or may be bonded by an adhesive layer.

Numerous modifications to, or adaptations of, the foregoing teachings can be made. For example, in addition to or as an alternative to die-cutting, the adhesive layer can be subjected to various treatments to modify the adhesive bond strength in a pattern-wise fashion. The treatment may have the effect of increasing the bond strength of the adhesive, in which case it may be used in area(s) intended to be covered by the phosphor layer in the finished product. One method of increasing bond strength is to use an adhesive that has low tack to the glass or plastic of the lens member, except when heated. An example of a suitable adhesive is a mixture of a photocured acrylic adhesive and an uncured, thermally curable epoxy. A hot stamp can then be used to increase the adhesion in one or more specific regions, and the bond strength can be sufficient to remove the phosphor layer in the unheated areas by the use of, for example, tabs (see FIG. 13 or 14) to lift the film.

Furthermore, laser ablation can also be used in patterning the phosphor layer. A suitable construction may comprise a phosphor layer, a metal layer, a laser-ablatable layer, and a structural layer. Such a procedure may involve patterning the laser ablatable layer using laser ablation, after which undamaged portion(s) of the structural layer may be removed so as to remove corresponding undamaged portion(s) of the phosphor from the lens, in area(s) not ablated by the laser.

Unless otherwise indicated, all numbers expressing feature sizes, amounts, physical properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application.

Various modifications and alterations of this invention will be apparent to those skilled in the art without departing from the scope and spirit of this invention, and it should be understood that this invention is not limited to the illustrative embodiments set forth herein. All U.S. patents, published and unpublished patent applications, and other patent and non-patent documents referred to herein are incorporated by reference, to the extent they do not directly contradict the foregoing disclosure.

The invention claimed is:

1. A method of making a lens assembly, comprising:
providing a lens member having an outer surface and an inner surface, the outer surface being curved to define an optical axis that intersects the inner surface;
attaching a dichroic reflector to at least a portion of the outer surface, the dichroic reflector being configured to reflect LED light originating from a given source point in a reference plane proximate the inner surface to a given image point in the reference plane;
removably bonding a phosphor layer to at least a portion of the inner surface, the phosphor layer comprising one or more first portions that cover one or more first portions of the inner surface and one or more second portions of the inner surface, the given image point being disposed proximate the one or more first portions of the inner surface and the given source point being disposed proximate the one or more second portions of the inner surface; and
patterning the phosphor layer to expose the one or more second portions of the inner surface such that light propagates from the source point to the dichroic reflector without passing through the phosphor layer.

2. The method of claim 1, wherein the patterning comprises scoring the phosphor layer between the one or more first portions and the one or more second portions of the phosphor layer, and separating the one or more second portions of the phosphor layer from the inner surface.

3. The method of claim 2, wherein the separating comprises peeling the one or more second portions of the phosphor layer away from the inner surface.

4. The method of claim 2, wherein the scoring comprises pressing a die cutter against the phosphor layer.

5. The method of claim 1, wherein the patterning comprises increasing a bond strength of the phosphor layer to the inner surface at the one or more first portions of the phosphor layer relative to a bond strength of the phosphor layer to the inner surface at the one or more second portions of the phosphor layer.

6. The method of claim 1, further comprising providing one or more tabs connected to the phosphor layer, and wherein the patterning comprises peeling away the one or more second portions of the phosphor layer using the one or more tabs.

* * * * *

UNITED STATES PATENT AND TRADEMARK OFFICE
CERTIFICATE OF CORRECTION

| | | |
|---|---|---|
| PATENT NO. | : 9,625,123 B2 | Page 1 of 1 |
| APPLICATION NO. | : 14/348384 | |
| DATED | : April 18, 2017 | |
| INVENTOR(S) | : Andrew Ouderkirk | |

It is certified that error appears in the above-identified patent and that said Letters Patent is hereby corrected as shown below:

Column 12
Line 27-34, Delete "A wide variety of alternative constructions to that shown in FIG. 5 are contemplated. For example, the adhesive layer 525 and/or the reflective layer 526 may be omitted. Furthermore, additional layers can be added to the constructions. Such additional layers may include one or more transparent spacer layers, structural layers, thermally conductive layers, and bonding layers." and insert the same on Column 12, Line 28, as a new paragraph.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*